US008867082B2

(12) United States Patent
Ishikawa

(10) Patent No.: US 8,867,082 B2
(45) Date of Patent: Oct. 21, 2014

(54) TRANSMITTING APPARATUS

(71) Applicant: KYOCERA Document Solutions Inc., Osaka (JP)

(72) Inventor: Suguru Ishikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/899,365

(22) Filed: May 21, 2013

(65) Prior Publication Data

US 2013/0321862 A1    Dec. 5, 2013

(30) Foreign Application Priority Data

May 31, 2012   (JP) ................................. 2012-125079

(51) Int. Cl.
*G06F 3/12*     (2006.01)
*H04N 1/00*     (2006.01)

(52) U.S. Cl.
CPC ............. *H04N 1/00381* (2013.01); *H04N 1/00* (2013.01)
USPC ....... 358/1.15; 358/1.13; 358/1.14; 358/1.16; 399/81; 715/863

(58) Field of Classification Search
CPC .............. G06F 3/04883; G06F 3/0488; G06F 2203/04808; G06F 3/017; G06F 3/0048; H04N 1/00381; H04N 1/00448; G03G 15/502
USPC .................. 358/1.15, 1.14, 1.13, 1.9; 399/81; 715/863
See application file for complete search history.

(56) References Cited

U.S. PATENT DOCUMENTS

| | | | | |
|---|---|---|---|---|
| 8,487,955 B2* | 7/2013 | Bala et al. | ...................... | 345/594 |
| 8,543,946 B2* | 9/2013 | Kethireddy | ................... | 715/863 |
| 8,659,767 B2* | 2/2014 | Iwase et al. | .................. | 358/1.13 |
| 8,687,211 B2* | 4/2014 | Mitsui et al. | ................. | 358/1.13 |
| 8,736,874 B2* | 5/2014 | Sensu et al. | ................... | 358/1.15 |
| 2009/0189869 A1* | 7/2009 | Nishimura | .................... | 345/173 |
| 2010/0067062 A1* | 3/2010 | Yanagawa | .................... | 358/3.27 |
| 2013/0311469 A1* | 11/2013 | Kim | ............................. | 707/737 |

FOREIGN PATENT DOCUMENTS

JP    05-219074 A    8/1993
JP    3068122 B2    7/2000

* cited by examiner

*Primary Examiner* — Dennis Dicker
(74) *Attorney, Agent, or Firm* — Studebaker & Brackett PC

(57) ABSTRACT

A transmitting apparatus includes a touch panel, a broadcast direction receiving part, a broadcast job executing part, a broadcast job display controlling part, a gesture detecting part and a broadcast job execution controlling part. The broadcast job display controlling part controls, when the broadcast direction receiving part receives an operation input directing execution of a broadcast, the touch panel to display identifying information of a transmission job and a job identifier indicating a communication state of the transmission job for every transmission jobs. The broadcast job execution controlling part controls, when a gesture area detected by the gesture detecting part is corresponding to a display area of a given job identifier among the job identifiers, the broadcast job executing part to not execute the transmission job not yet transmitted among the transmission jobs corresponding to the job identifiers.

13 Claims, 10 Drawing Sheets

TRANSMITTING APPARATUS

INCORPORATION BY REFERENCE

This application is based on and claims the benefit of priority from Japanese Patent application No. 2012-125079 filed on May 31, 2012, the entire contents of which are incorporated herein by reference.

BACKGROUND

The present disclosure relates to a transmitting apparatus having a broadcast function.

The machinery, such as a facsimile apparatus and a multifunction machine, may work as a transmitting apparatus to transmit data to a destination device corresponding to destination information inputted by a user. Such machinery as the transmitting apparatus may have a so-called broadcast function simultaneously transmitting the same data to a plurality of the destination devices. In the broadcast, because the destination devices may extend to several hundred cases, various user interfaces are proposed in order to avoid input mistake of the destination information.

For example, in order to avoid the input mistake of the destination information, there are proposals that have the user confirm whether or not the destination information is correct and that have the user input the destination information twice. Moreover, another proposed facsimile automatically detects, when a common destination is registered to a plurality of groups, redundancy of the destination and calls the redundant destination once or deletes the redundant destination.

As mentioned above, the transmitting apparatus may have any function detecting the input mistake of the destination information before transmitting or detecting the redundant destination. However, the user may notice the mistake of the destination after directing the data transmission. In such a case, in the transmitting apparatus, it is necessary to operate procedures determined in advance in order to cancel a transmission job in a transmitting or waiting state. Therefore, there are problems that an operation of canceling the transmission job is complicated for the user and that the operation of the cancel takes time. In addition, according to circumstances of a transmission mode, it may be necessary to execute the operation of canceling the transmission jobs for each transmission job. Therefore, when the cancel of a plurality of the transmission jobs are desired, during operating the cancel of one transmission job, there is another problem that the execution of other transmission jobs being desired to cancel is completed.

SUMMARY

In accordance with an embodiment of the present disclosure, a transmitting apparatus includes a touch panel, a broadcast direction receiving part, a broadcast job executing part, a broadcast job display controlling part, a gesture detecting part and a broadcast job execution controlling part and is configured to have a broadcast function transmitting data to a plurality of destination devices via a communication network. The touch panel is configured to include a displaying part with a display and a sensing part located at the display side of the displaying part to detect a position and/or an area of a contact object and to output operating position information as detected information, to display a predetermined display image and to receive an operation input having a gesture. The broadcast direction receiving part is configured to receive the operation input directing execution of the broadcast. The broadcast job executing part is configured to execute, when the broadcast direction receiving part receives the operation input directing the execution of the broadcast, a plurality of transmission jobs in a predetermined order. The broadcast job display controlling part is configured to control, when the broadcast direction receiving part receives the operation input directing the execution of the broadcast, the display so as to display identifying information of the transmission job and a job identifier indicating a communication state of the transmission job for every transmission jobs. The gesture detecting part is configured to detect, on the basis of the operating position information outputted from the touch panel, a gesture area handled on the touch panel by the contact object. The broadcast job execution controlling part is configured to control, when the gesture area detected by the gesture detecting part is an entirely or partly corresponding area to a given area having a display area of one or more given job identifiers among a plurality of the job identifiers, the broadcast job executing part to not execute the transmission job not yet transmitted among the transmission jobs corresponding to the one or more given job identifiers.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
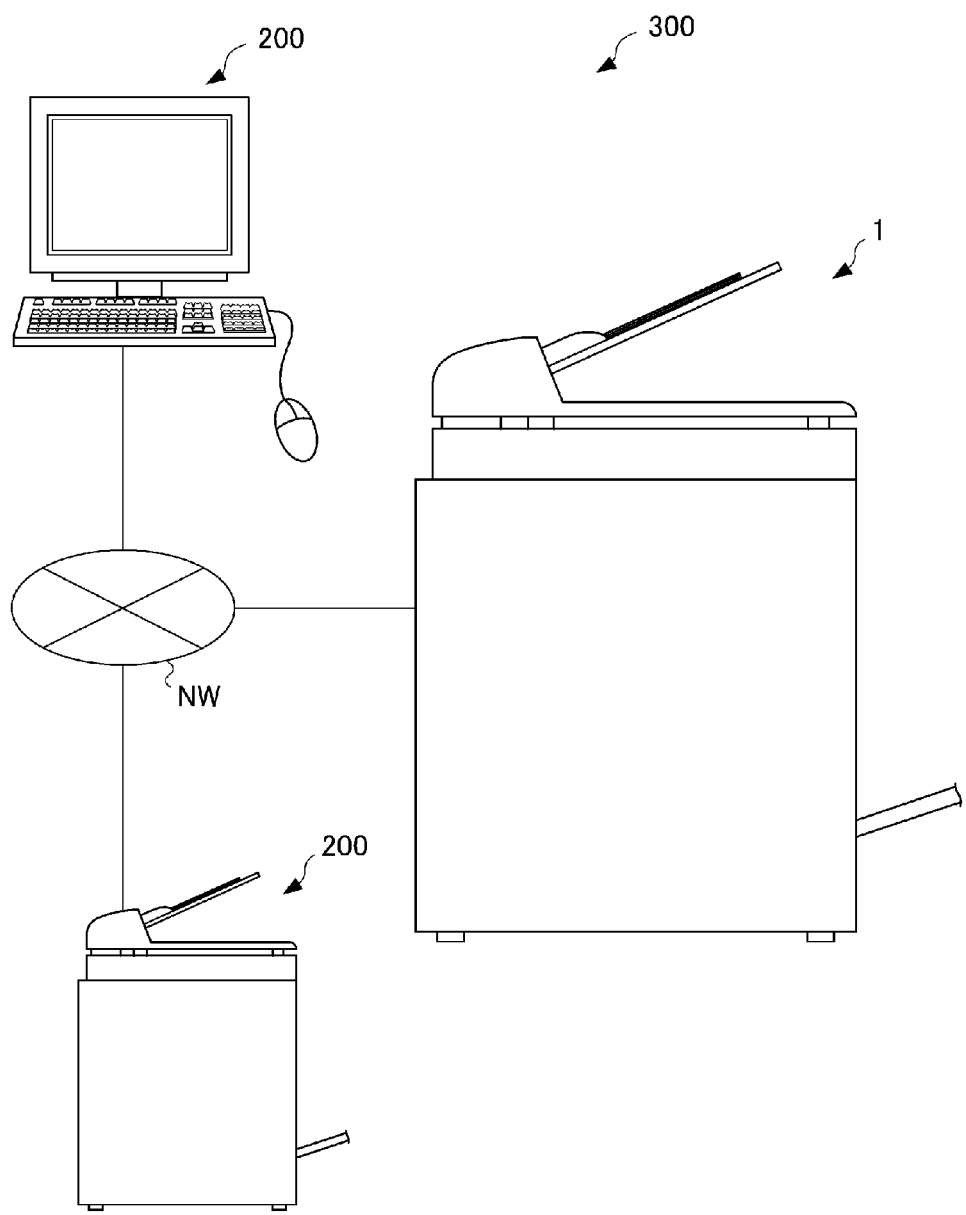
FIG. 1 is a schematic diagram schematically showing a configuration of an image forming system according to an embodiment of the present disclosure.
Figure 2:
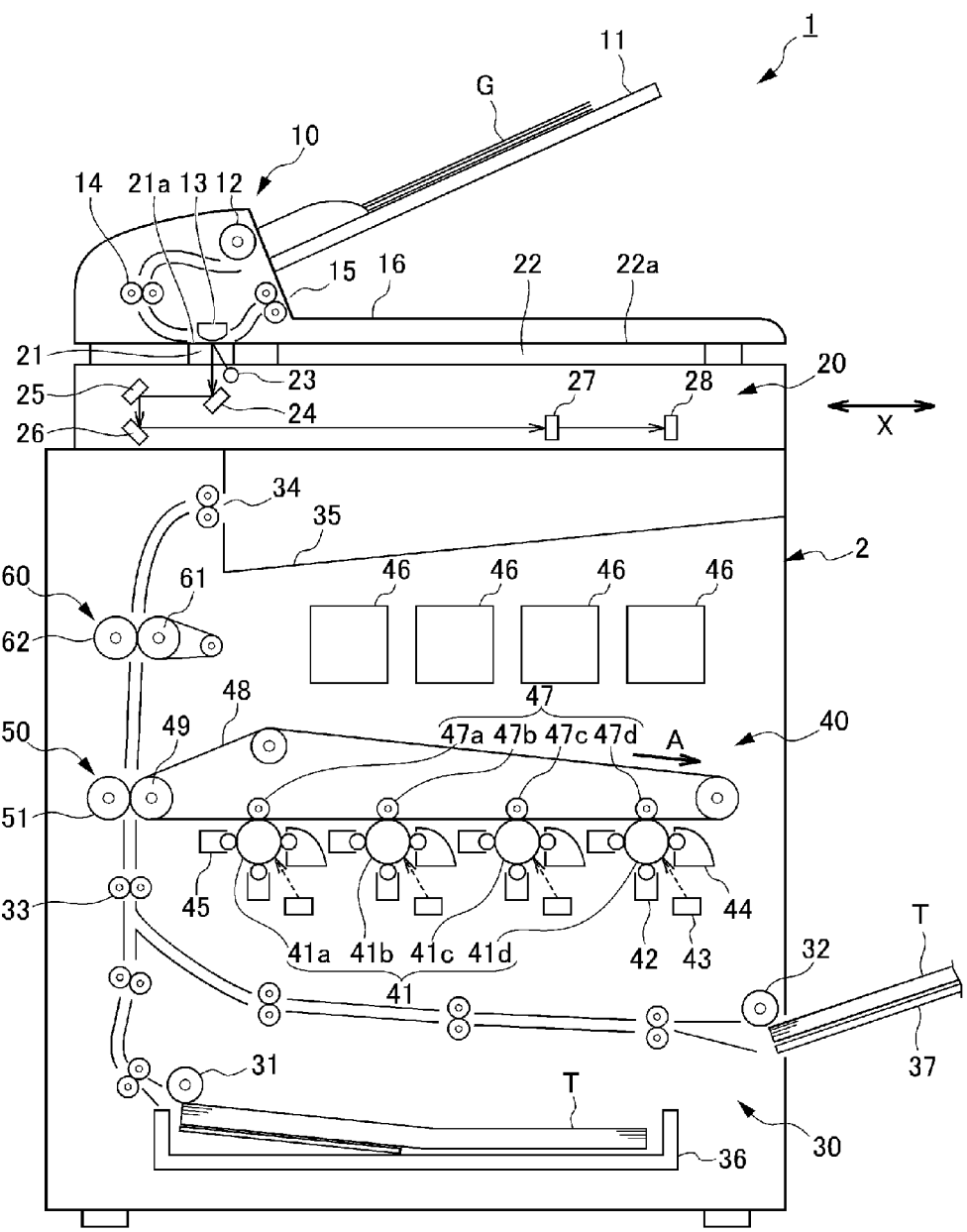
FIG. 2 is a schematic diagram schematically showing a configuration of a multifunction machine of the image forming system according to the embodiment of the present disclosure.

In the following, with reference to the figures, an embodiment of a multifunction machine 1 having a function of a transmitting apparatus in accordance with the present disclosure will be described. FIG. 1 schematically shows an entire configuration of an image forming system 300 including the multifunction machine 1. FIG. 2 schematically shows an entire configuration of the multifunction machine 1.

First, the entire configuration of the image forming system 300 will be described. As shown in FIG. 1, the image forming system 300 is configured so that the multifunction machine 1 functioning as the transmitting apparatus of the present disclosure and a plurality of terminal devices 200 are connected with each other via a communication network NW, such as a local area network, to enable intercommunication. As illustrated in the figure, the image forming system 300 is configured so that one multifunction machine 1 can be connected with the plurality of the terminal devices 200. In such a connectable configuration of one multifunction machine 1 with the plurality of the terminal devices 200, the plurality of the terminal devices 200 may be concurrently connected, or alternatively, the plurality of the terminal devices 200 may be connected at respective different timings.

The terminal device 200 may be a desktop type terminal device placed immovably or a notebook type terminal device being potable by a user. In the embodiment, the terminal devices 200 individually have an email address or a file transfer protocol (FTP) address. The terminal device 200 may be a multifunction machine functioning as a facsimile. In this case, the terminal device 200 has an individual facsimile number.

The multifunction machine 1 can transmit/receive data to/from each terminal device 200 via the communication network NW. When, to the multifunction machine 1, the email address, FTP address or facsimile number (hereinafter, often called as destination information) corresponding with one destination is specified by the user to indicate execution of a transmission job, the multifunction machine 1 can transmit predetermined data to one terminal device 200. In addition, when, to the multifunction machine 1, the destination information corresponding with a plurality of the destinations and data are specified by the user to indicate execution of transmission jobs, the multifunction machine 1 can broadcast-transmit a predetermined data to the plurality of the terminal devices 200. In the embodiment, a configuration and functions for executing the broadcast or broadcast transmission in the multifunction machine 1 are mainly described. Therefore, another configuration and other functions of data transmission to one terminal device 200 in the multifunction machine 1 are suitably omitted or abbreviated.

The terminal device 200 also has functions of transmitting (or broadcast-transmitting) predetermined data to the multifunction machine 1 or the other terminal device 200 via the communication network NW.

Next, the configuration of the multifunction machine 1 will be described. As shown in FIG. 2, the multifunction machine 1 of the embodiment is an electrographic image forming apparatus to include a document conveying section 10, a document reading section 20, a sheet conveying section 30, an image forming section 40, a transferring section 50 and a fixing section 60.

The document conveying section 10 is an automatic document feeder (ADF) to include a document placement part 11, a first feeding roller 12, a guide 13, a pair of timing rollers 14 and a document ejecting part 15. The first feeding roller 12 feeds documents G placed on the document placement part 11 to the pair of the timing rollers 14 one by one in sequence. The pair of the timing rollers 14 carries out conveyance of the document G or a stop of conveyance of the document G in order to synchronize a timing of reading an image of the document G by the document reading section 20 with another timing of feeding the document G to a read position (a position at which the guide 13 is located) of the image of the document G on the document reading section 20. The guide 13 guides the conveyed document G to a following first reading face 21a. The document ejecting part 15 ejects the document G after the read of the image by the document reading section 20 outside of the multifunction machine main body 2.

In the document ejecting part 15, outside the multifunction machine main body 2, a document accumulator 16 is formed. On the document accumulator 16, the document G ejected from the document ejecting part 15 is laminated and accumulated.

The document reading section 20 includes the first reading face 21a and second reading face 22a. The first reading face 21a is formed along a top surface of a first contact glass 21 located in a faced state to the guide 13, thereby working as a face of reading the image of the document G. The second reading face 22a is located adjacent to the first reading face 21a (over the majority a right side of the first reading face 21a in a case shown in FIG. 2). The second reading face 22a is used to read the image of the document G without using the document conveying section 10. The second reading face 22a is formed along a top surface of a second contact glass 22 on which the document G is placed, thereby working as another face of reading the image of the document G.

In addition, the document reading section 20 includes a lighting part 23, a first mirror 24, a second mirror 25, a third mirror 26, an imaging lens 27 and an image pickup part 28 in the multifunction machine main body 2. The lighting part 23 and first mirror 24 are configured to shift in a vertical scanning direction X. The second mirror 25 and third mirror 26 are located at a left side of the lighting part 23 and first mirror 24 in FIG. 2. The second mirror 25 and third mirror 26 are also configured to shift in a vertical scanning direction X with maintaining a predetermined length (an optical path length) from the first reading face 21a to the second reading face 22a via the lighting part 23, first mirror 24, second mirror 25, third mirror 26 and imaging lens 27.

The lighting part 23 is a light source of irradiating light to the document G. The first mirror 24, second mirror 25 and third mirror 26 are mirrors for bringing light reflected by the document G to the imaging lens 27 with maintaining the predetermined optical path length. The imaging lens 27 focuses into an image of incident light from the third mirror 26 on the image pickup part 28. The image pickup part 28 is an image sensing device of acquiring image data according to the focused light image by converting the incident light to an electrical signal. For example, the image pickup part 28 is an image sensor including a charge coupled device (CCD) or a complementary metal oxide semiconductor (CMOS).

The sheet conveying section 30 includes a second feeding roller 31, a third feeding roller 32, a pair of resistance rollers 33 and a sheet ejecting part 34. The second feeding roller 31 feeds a sheet T (a medium on which an image is formed) stored in a sheet feeding cartridge 36 to the transferring section 50. The third feeding roller 32 feeds the sheet T (the medium on which an image is formed) placed on a manual bypass tray 37 to the transferring section 50. The pair of the resistance rollers 33 carries out conveyance of the sheet T or a stop of conveyance of the sheet T in order to synchronize a timing of arrival of a toner image (a developed image) at the transferring section 50 with another timing of feeding the sheet T to the transferring section 50. The pair of the resistance rollers 33 also corrects skew (diagonal feeding) of the sheet T. The sheet ejecting part 34 ejects the sheet T on which the toner image is fixed outside of the multifunction machine main body 2.

In the sheet ejecting part 34, outside of the multifunction machine main body 2, an ejected sheet accumulator 35 is formed. On the ejected sheet accumulator 35, the sheet T ejected from the sheet ejecting part 34 is laminated ant accumulated.

The image forming section 40 is adapted to form the toner image and to include photosensitive drums 41, chargers 42, laser scanning units 43, development devices 44, cleaning parts 45, toner cartridges 46, first transfer rollers 47, an intermediate transferring belt 48 and a facing roller 49.

The photosensitive drums 41 (41a, 41b, 41c, 41d) functions as a photoreceptor or an image carrier in order to form respective toner images in colors of black, cyan, magenta and yellow. Around each photosensitive drum 41a, 41b, 41c or 41d, the charger 42, laser scanning unit 43, development device 44 and cleaning part 45 are located along a rotating direction of the photosensitive drum 41 from an upper stream side to a lower stream side. The charger 42 takes an electrical charge to a surface of the photosensitive drum 41. The laser scanning unit 43 is separately located from the surface of the photosensitive drum 41 to scan and expose on the surface of the photosensitive drum 41 according to the image data read out from the document G by the document reading section 20. Thereby, on the surface of the photosensitive drum 41, electrical charges on the exposed area are removed and an electrostatic latent image is formed. The development device 44 makes a toner (a developer) applied to the electrostatic latent image formed on the surface of the photosensitive drum 41 to form the toner image. The cleaning part 45 removes a toner remaining on the surface of the photosensitive drum 41 after static electricity on the surface is eliminated by a static eliminator (not shown).

The toner cartridge 46 houses each color toner supplied to the development device 44. The toner cartridge 46 and development device 44 are connected via a toner supply channel (not shown).

The first transfer rollers 47 (47a, 47b, 47c, 47d) are respectively located at opposite sides to the photosensitive drums 41a, 41b, 41c and 41d across the intermediate transferring belt 48. The intermediate transferring belt 48 is a belt passing through the image forming section 40 and transferring section 50. Parts of the intermediate transferring belt 48 are respectively put between the photosensitive drums 41a, 41b, 41c and 41d and first transfer rollers 47a, 47b, 47c and 47d to take first transfers of the toner images formed on the photosensitive drums 41a, 41b, 41c and 41d. The facing roller 49 is a driving roller located inside the annular-formed intermediate transferring belt 48 to run the intermediate transferring belt 48 in a direction indicated by arrow A shown in FIG. 2.

The transferring section 50 includes a second transfer roller 51. The second transfer roller 51 is located at opposite sides to the facing roller 49 across the intermediate transferring belt 48 and, between the second transfer roller 51 and the facing roller 49, a part of the intermediate transferring belt 48 is put. The second transfer roller 51 also second-transfers the first-transferred toner image on the intermediate transferring belt 48 to the sheet T.

The fixing section 60 includes a heating rotating member 61 and a pressuring rotating member 62. Between the heating rotating member 61 and pressuring rotating member 62, the sheet T having the second-transferred toner image is put to melt and pressurize the toner and to fix the toner on the sheet T.

Figure 3:
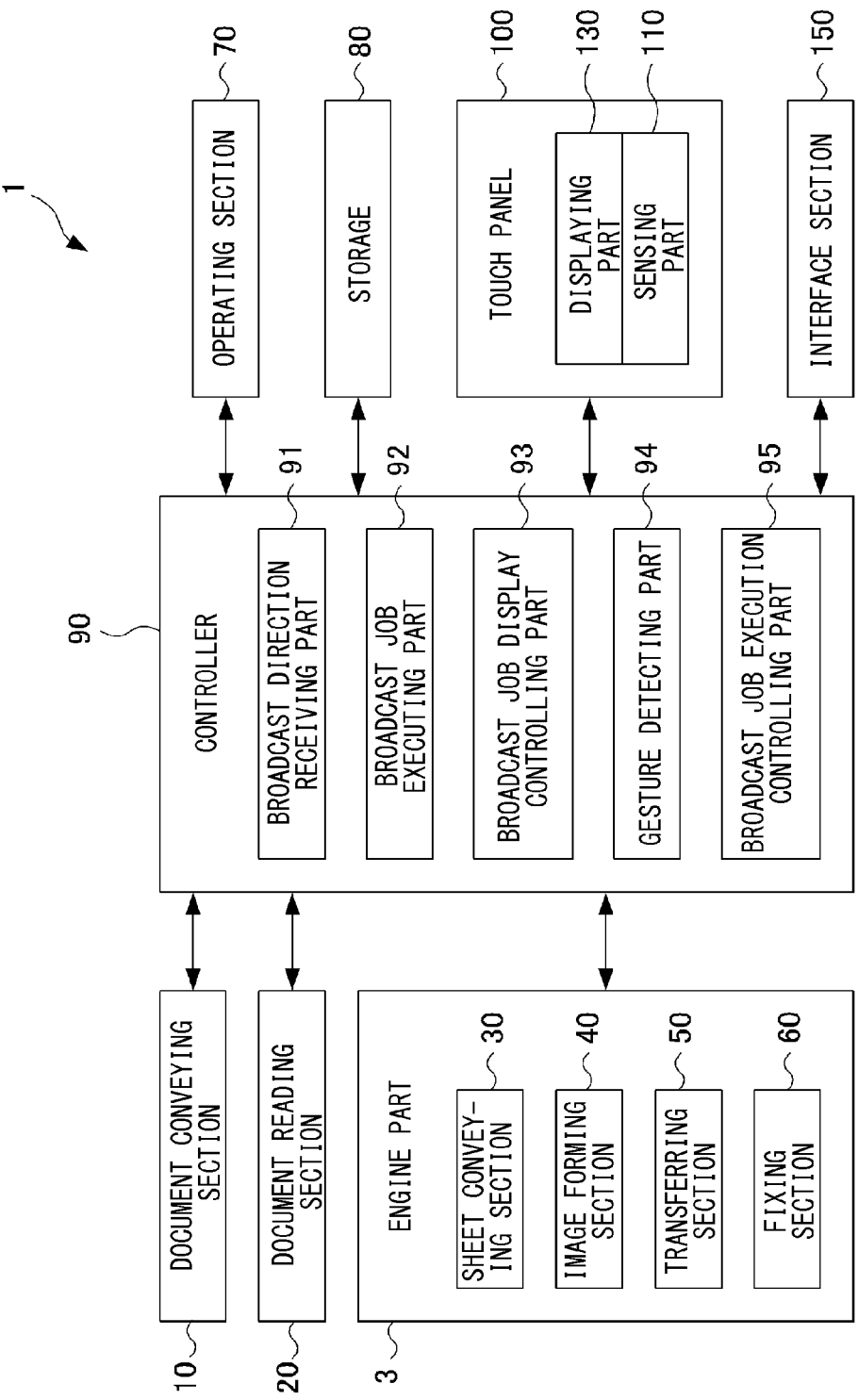
FIG. 3 is a block diagram schematically showing a functional configuration of the multifunction machine according to the embodiment of the present disclosure.
Figure 4:
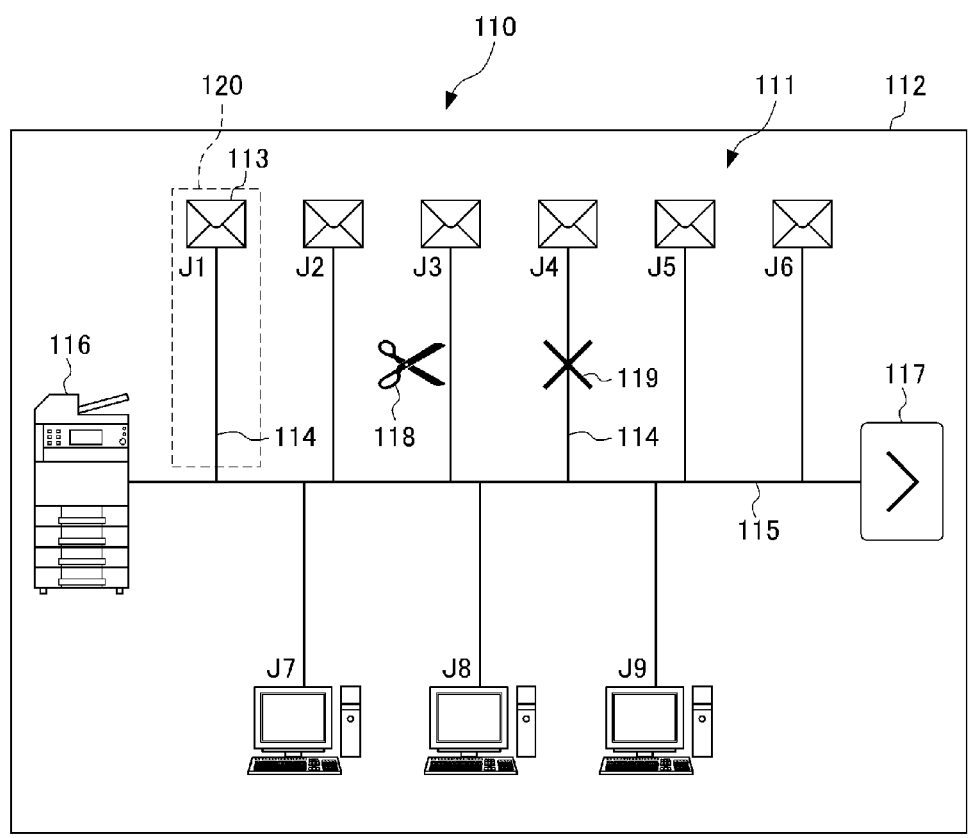
FIG. 4 is an illustrative diagram schematically showing a display image displayed on a display of a touch panel in broadcast in the multifunction machine according to the embodiment of the present disclosure.

Next, the functional configuration of the multifunction machine 1 will be described. FIG. 3 shows a schematic block diagram of the functional configuration of the multifunction machine 1. FIG. 4 shows an illustration of a display image 111 displayed on a display 112 of a touch panel 100 in broadcast.

As shown in FIG. 3, the multifunction machine 1 includes above-mentioned components (the document conveying section 10, document reading section 20, sheet conveying section 30, image forming section 40, transferring section 50 and fixing section 60). The sheet conveying section 30, image forming section 40 and transferring section 50 compose an engine part 3. The engine part 3 is configured to form the image on the sheet T according to the image data. With regard to the components already described with reference to FIG. 2, further description is omitted or abbreviated.

In addition to the above-mentioned components, the multifunction machine 1 includes an operating section 70, storage 80, the touch panel 100, an interface section 150 and a controller 90. Hereinafter, the additional components will be described in this order.

The operating section 70 includes numeric keys, start key or other keys (not shown). The numeric keys are input devices operated by the user in order to input numerals, such as the number of prints, to the multifunction machine 1. The start key is another input device operated by the user in order to direct various processes (execution of the print, execution of transmission or broadcast or other processes) to the multifunction machine 1. The operating section 70 outputs, when any key is operated (depressed or touched), a signal indicating the operation of the key to the controller 90. Alternatively, all the keys or parts of the keys arranged on the operating section 70 may be arranged on the touch panel 100 (mentioned below).

The storage 80 is configured with a hard disk, a semiconductor memory or other storing medium. The storage 80 stores the image data according to the document G read out by the document reading section 20. The storage 80 also stores control program used in the multifunction machine 1, data used by the control program or the like. In addition, the storage 80 stores email address, FTP address, facsimile number or other information. Moreover, the storage 80 stores a plurality of transmission jobs established via the touch panel 100.

The touch panel 100 is a display-type input device capable to receive an operation input having a gesture of the user. The touch panel 100 includes a displaying part 110 and a sensing part 130. In the touch panel 100, the sensing part 130 is located and laminated on a display face side of the displaying part 110.

The displaying part 110 includes, as shown in FIG. 4, the display 112 displaying the display image 111. The display 112 displays, for example, the display image 111 having various operation keys assigned a function setting magnification of the print and a function laying out a plurality of pages to one sheet T (not shown). FIG. 4 illustrates the display image 111 on which all displayable icons in the broadcast of the embodiment are appeared. That is, all the icons shown in FIG. 4 is not simultaneously displayed on the same display image 111, but selectively displayed as necessary.

If execution of the broadcast is directed, the display 112 displays the display image 111 having a job identifying image (a job identifier) corresponded to each transmission job. In the illustration as shown in FIG. 4, the display 112 displays the display image 111 having the job identifying images J1 to J9 respectively corresponded to nine transmission jobs.

In addition, the touch panel 100 is configured to receive user's choice operation of destination information of a transmission destination to be transmitted data. That is, the user makes the display 112 of the touch panel 100 displayed the display image 111 having a corresponding list of the destination information and transmission destination (not shown) and chooses the desired transmission destination of the data transmission from the list. The user also makes the display 112 of the touch panel 100 displayed the display image 111 having another list of data (not shown) and chooses the desired data of the transmission from the other list.

If the transmission destination and data are chosen by the user, the controller 90 (described below) sets the transmission job corresponding to the transmission destination and stores the job in a given area of the storage 80. Then, if the execution of the broadcast is directed by the user, the controller 90 controls the display 112 to display the display image 111 having the job identifying images J1 to J9 as shown in FIG. 4.

Here, as an example of the job identifying image, the job identifying image J1 will be described. As shown in FIG. 4, the job identifying image J1 has a destination icon 113 and a connecting line 114.

The destination icon 113 indicates information identifying the transmission job, for example, is displayed with additional information as a transmission job name (e.g. a destination name), such as "J1". The destination icons 113 are designed, as shown in FIG. 4, by an envelope picture in case of transmitting the data via browser/email software to the destination or a personal computer (PC) picture in case of transmitting the data to the destination by using the FTP address. In addition, not shown in FIG. 4, the design may be a facsimile device picture in case of transmitting the data to the destination by a facsimile function. As mentioned below, appearance of the destination icon 113 indicating the job identifying image as a subject to cancel is displayed so as to be differed or distinguished from other job identifying images.

The connecting line 114 indicates information of a communication state of a corresponding transmission job. One ends of the connecting lines 114 are connected with the respective destination icons 113. Other ends of the connecting lines 114 are connected with a communication network 115 (corresponding to the communication network NW in FIG. 1). As mentioned below, appearance of the connecting line 114 is varied according to the communication state of the corresponding transmission job. In the embodiment, the appearance of the connecting line 114 is distinguished by line type (a single line, double lines or a broken line) corresponded to colors of an actual display, but FIG. 4 illustrates all the connecting lines 114 designed by the same line.

In FIG. 4, an operation area 120 is a predetermined area having a displayed area of the job identifying image J1. The operation areas 120 are respectively set to the job identifying images J1 to J9. For instance, in FIG. 4, the operation area 120 of the job identifying image J1 is illustrated, but other operation areas of the job identifying images J2 to J9 are omitted.

In addition, in FIG. 4, on one end of the communication network 115, an icon 116 indicating the multifunction machine 1 (the present machine) executing the broadcast is displayed. On another end of the communication network 115, another icon 117 for page ejection is displayed. If the user indicates (touches the surface of the sensing part 130) the icon 117 by his/her own finger, the display 112 displays the display image 111 of next page.

In the embodiment, an example of displaying the display image 111 as shown in FIG. 4 on the displaying part 110 in the broadcast is described, but the same display image 111 may be displayed in a case of transmitting the data to one destination.

With reference to FIG. 3 again, a further description is advanced. The sensing part 130 is an input device configured to detect a contact position and/or a contact area of a contact object (herein after, generally called as "finger"), such as a finger of the user or a pen, and to output detected information as operating position information to the controller 90. The sensing part 130 has optical transparency. Therefore, the user can visually see the display image 111 displayed on the display 112 of the displaying part 110 through the sensing part 130.

The sensing part 130 detects a position when the finger of the user points to the surface of the sensing part 130 and an area when the finger of the user slides on the surface of the sensing part 130. In the embodiment, the detected position when the finger of the user points to the surface of the sensing part 130 and the detected area when the finger of the user slides on the surface of the sensing part 130 are generally called as "gesture area".

The user can visually see the operation keys and icons (refer to FIG. 4) displayed by the display image 111 through the sensing part 130. If the user aims a desired operation key or icon from among the operation keys and icons displayed by the display image 111 and points to the surface of the sensing part 130 by the finger the contact position and/or area of the user's finger are/is detected and the operating position information is outputted to the controller 90. The controller 90 can identify on the based on the operating position information outputted from the sensing part 130 which of the operation keys and icons displayed by the display image 111 is operated. Detection of the gesture area by controller 90 is described as follows.

As the above-mentioned sensing part 130, for example, an electrostatic capacitance type, a resistive film type, an electromagnetic induction type, a surface acoustic wave type (an ultrasonic wave type), an infrared lays type or a load detection type sensor may be used.

The interface section 150 is connected with the communication network NW (refer to FIG. 1). The data transmitted from one or more terminal devices 200 are received by the multifunction machine 1 via the interface section 150 from the communication network NW. The data transmitted from the multifunction machine 1 are transmitted to one or more terminal devices 200 via the communication network NW from the interface section 150.

Next, the controller 90 will be described. The controller 90 controls the document conveying section 10, document reading section 20, engine part 3, operating section 70 and other components.

The controller 90 includes a broadcast direction receiving part 91, a broadcast job executing part 92, a broadcast job display controlling part 93, a gesture detecting part 94 and a broadcast job execution controlling part 95.

The broadcast direction receiving part 91 receives the operation input directing the execution of the broadcast. If the user operates the start key of the operating section 70, the broadcast direction receiving part 91 receives the operation input directing the execution of the broadcast. When receiving the operation input directing the execution of the broadcast, the broadcast direction receiving part 91 notifies the broadcast job executing part 92, broadcast job display controlling part 93 and broadcast job execution controlling part 95 of the reception of the operation input directing the execution of the broadcast.

The broadcast job executing part 92 executes, when the reception of the operation input directing the execution of the broadcast is notified, data transmission with regard to a plurality of the transmission jobs stored in the storage 80 in order from the top transmission job. The broadcast job executing part 92 transmits the data to the destination corresponding to the destination information for each transmission job.

The broadcast job display controlling part 93 controls, when the reception of the operation input directing the execution of the broadcast is notified, the display 112 of the displaying part 110 to display the display image 111 having the job identifying images (the job identifier) which have the destination icon 113 as the identifying information of the transmission job and connecting line 114 indicating the communication state of the transmission job for every transmission jobs (refer to FIG. 4).

The broadcast job display controlling part 93 also varies the appearance of the job identifying image displayed on the display 112 according to the communication state of the transmission job corresponding to the job identifying image. Concretely, the broadcast job display controlling part 93 varies the appearance of the connecting line 114 (refer to FIG. 4) of the job identifying image according to the communication state of the transmission job corresponding to the job identifying image. For example, if the data transmission is running, the connecting line 114 is displayed by a red line. Alternatively, if the data transmission is waiting, the connecting line 114 is displayed by a grey line. Moreover, if the data transmission is completed, the connecting line 114 is displayed by a blue line. Furthermore, if an error is caused in the data transmission, the connecting line 114 is displayed by a green line.

In the figures of the embodiment, if the data transmission is running, the connecting line 114 is displayed by single bold line (corresponding to the red line on the actual display). Alternatively, if the data transmission is waiting, the connecting line 114 is displayed by double thin lines (corresponding to the grey line on the actual display). Moreover, if the data transmission is completed, the connecting line 114 is displayed by single thin line (corresponding to the blue line on the actual display). Furthermore, if an error is caused in the data transmission, the connecting line 114 is displayed by a broken line (corresponding to the green line on the actual display).

In addition, the broadcast job display controlling part 93 controls, when the gesture area detected by the gesture detecting part 94 (mentioned below) is an area partly corresponding to the operation area 120 having a display area of one job identifying image among the plurality of the job identifying images, to display the appearance of the job identifying image on the display 112 so as to be differed or distinguished from other job identifying images.

Concretely, the broadcast job display controlling part 93 controls, when the gesture area detected by the gesture detecting part 94 is an area of the destination icon 113 of one job identifying image among the plurality of the job identifying images, to blinkingly display the connecting line 114 of the job identifying image (connecting lines 114 of other job identifying images are lightly displayed). Here, the area of the destination icon 113 of one job identifying image is, for example, the gesture area detected when the user points to the destination icon 113 of one job identifying image by the finger.

In the following description, the job identifying image corresponding to the gesture area as mentioned above will be often called as "a job identifying image as a cancel subject". In addition, the transmission job corresponding to the job identifying image as the cancel subject will be often called as "a transmission job as a cancel subject".

Moreover, the broadcast job display controlling part 93 controls, when the gesture area detected by the gesture detecting part 94 is the area partly corresponding to the operation area 120 having the display area of one job identifying image among the plurality of the job identifying images, the display 112 to display a process identifier indicating an executable process for the transmission job as the cancel subject.

Concretely, the broadcast job display controlling part 93 controls, when the gesture area detected by the gesture detecting part 94 is the area of the destination icon 113 of one job identifying image, to blinkingly display the connecting line 114 of the job identifying image as the cancel subject and to display a cancel execution icon 118 (a picture of a pair of scissors) as the process identifier inside or near the operation area 120 of the job identifying image as the cancel subject (herein after, often called as "in the operation area 120"). The cancel execution icon 118 indicates a process canceling the transmission job. FIG. 4 illustrates a case of displaying the cancel execution icon 118 near the job identifying image J3.

The broadcast job display controlling part 93 also controls, when the broadcast job executing part 92 is executing the process indicated by the cancel execution icon 118 to the transmission job corresponding to the job identifying image as the cancel subject, the display 112 to display a process executing identifier indicating that the process indicated by the cancel execution icon 118 is executing. Concretely, the broadcast job display controlling part 93 displays, as the process executing identifier, the blinking (omitted in the figures) of the cancel execution icon 118 as shown in FIG. 4.

Because the cancel execution icon 118 as the process identifier is blinkingly displayed to become the process executing identifier, the user directly can understand that the process of the cancel execution icon 118 is executing. In addition, because the displayed icons are kept in the small quantities, it is possible to provide operation environment easily understood by the user.

Moreover, the broadcast job display controlling part 93 controls, when the broadcast job executing part 92 completes the execution of the process indicated by the cancel execution icon 118 (the process identifier), the display 112 to display a process completion identifier indicating that the process indicated by the cancel execution icon 118 is completed.

Concretely, as shown in FIG. 4, the broadcast job display controlling part 93 displays a cancel completion icon 119 (an X-shaped picture) as the process completion identifier. The cancel completion icon 119 is an icon indicating that the cancel of the transmission job is completed. The cancel completion icon 119 is displayed, for example, so as to be superimposed on the connecting line 114 of the job identifying image as the cancel subject. FIG. 4 illustrates a case of displaying the cancel completion icon 119 superimposed on the connecting line 114 of the job identifying image J4.

The gesture detecting part 94 detects, on the basis of the operating position information outputted from the touch panel 100 (the sensing part 130), the gesture area (a coordinate data group) handled on the touch panel 100 by the user. The gesture detecting part 94 also transmits the detected gesture area to the broadcast job execution controlling part 95.

The broadcast job execution controlling part 95 controls, in a situation of displaying the cancel execution icon 118 on the display 112, when the gesture area detected by the gesture detecting part 94 is a gesture area corresponding to a predetermined pattern and an area partly corresponding to the operation area 120 having the job identifying image, the broadcast job executing part 92 to not execute transmission jobs not yet transmitted among the transmission jobs corresponding to the job identifying image.

Here, the gesture area corresponding to the predetermined pattern is, for example, a gesture area detected when the user handles a gesture of horizontally sliding the finger on the display 112. The area partly corresponding to the operation area 120 having the job identifying image is, for example, a gesture area detected when the user handles a gesture of sliding the finger across the operation area 120 of the job identifying image.

Not-execution of the transmission jobs implies the cancel (withdrawal) of the transmission job, carrying down of a turn to execute the transmission job, a hold or interruption of the execution of the transmission job. In the embodiment, mainly a case of canceling the transmission job will be described, but the carrying down of the turn to execute the transmission job and the hold or interruption of the execution of the transmission job are implied in the not-execution of the transmission jobs.

As mentioned above, the broadcast job execution controlling part 95 controls, in a situation of displaying the cancel execution icon 118 on the display 112, when the gesture area detected by the gesture detecting part 94 is a gesture area detected in a gesture of sliding across the operation area 120 of the job identifying image as the cancel subject, if the transmission job corresponding to the job identifying image is not yet transmitted, the broadcast job executing part 92 to cancel the transmission job.

That is, the broadcast job execution controlling part 95 controls, during the execution of the broadcast, when both two gesture areas (a gesture of pointing by the finger and another gesture of sliding the finger horizontally) detected by the gesture detecting part 94 are areas partly corresponding to the operation area 120 having the display area of one job identifying image, if the transmission job corresponding to the job identifying image is not yet transmitted, the broadcast job executing part 92 to cancel the transmission job.

Figure 5:
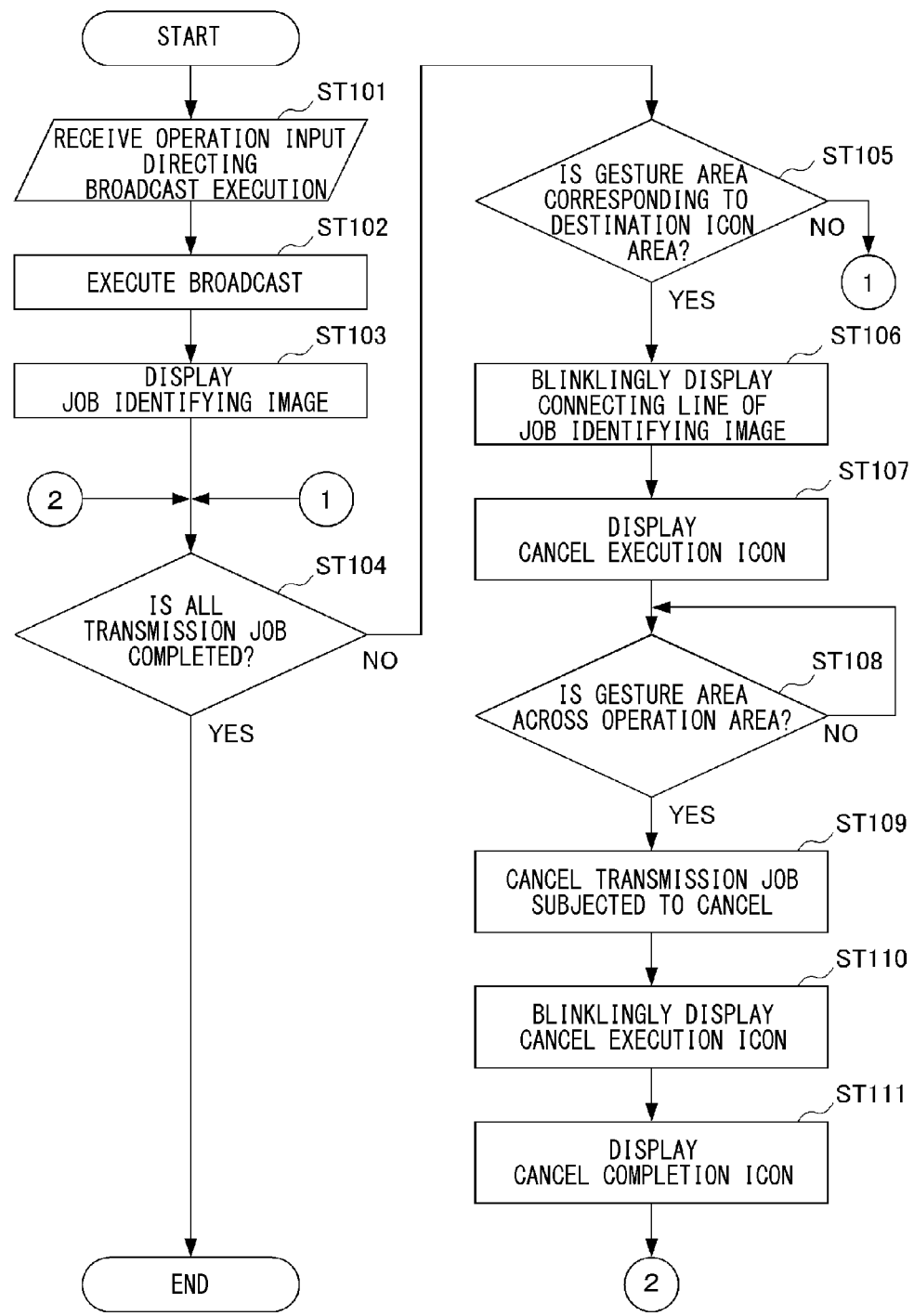
FIG. 5 is a flow chart illustrating a procedure in a case where the broadcast is executed by a controller.

Next, the operation in a case of executing the broadcast in the multifunction machine 1 of the embodiment will be described with reference to FIG. 5. FIG. 5 is a flow chart illustrating a procedure in the case of executing the broadcast by the controller 90.

Before directing the execution of the broadcast, the user chooses the destinations of the data transmission and the data by means of the touch panel 100. Then, the transmission jobs respectively corresponding to the destinations are set and stored in a given area of the storage 80. Here, the transmission jobs corresponding to nine destinations (the job identifying images J1 to J9 as shown in FIG. 4) are set. In the nine transmission jobs, six jobs (the job identifying images J1 to J6) are email transmissions by the browser/email software and three jobs (the job identifying images J7 to J9) are data transmissions by using the FTP addresses.

In a step ST101 shown in FIG. 5, the broadcast direction receiving part 91 receives the operation input directing the execution of the broadcast. The user can direct the execution of the broadcast by handling the start key of the operating section 70 (refer to FIG. 3).

In a step ST102, the broadcast job executing part 92 executes data transmission (the broadcast transmission) with regard to a plurality of the transmission jobs stored in the storage 80 in order from the top transmission job. With regard to an operation of establishing the communication protocol between the broadcast job executing part 92 and terminal device 200 (a destination device) and a series of operations of transmitting the data, the description is omitted.

In a step ST103, the broadcast job display controlling part 93 controls the display 112 to display the job identifying images having the destination icon 113 as the identifying information of the transmission job and connecting line 114 indicating the communication state of the transmission job for every transmission jobs. A concrete example of the job identifying image displayed on the display 112 will be described as follows.

In a step ST104, the broadcast job executing part 92 decides whether or not, to all the transmission jobs stored in the storage 80, the data transmission is completed. At that moment, when the broadcast job executing part 92 decides that the data transmission is completed to all the transmission jobs (YES, step ST104), the processing of the flow chart is finished. On the other hand, when the broadcast job executing part 92 decides that the data transmission is not completed to all the transmission jobs (NO, step ST104), the processing advances to a step ST105.

In the step ST105, the broadcast job display controlling part 93 decides whether or not the gesture area detected by the gesture detecting part 94 is an area of the destination icon 113 of one job identifying image. At that moment, when the broadcast job display controlling part 93 decides that the gesture area detected by the gesture detecting part 94 is the area of the destination icon 113 of one job identifying image (YES, step ST105), the processing advances to a step ST106. On the other hand, when the broadcast job display controlling part 93 decides that the gesture area detected by the gesture detecting part 94 is not the area of the destination icon 113 of one job identifying image (NO, step ST105), the processing returns to the step ST104.

As described as follows, after the user directs the execution of the broadcast, in order to cancel the data transmission to an incorrect destination, the user shall handle a gesture pointing to the destination icon 113 of the job identifying image corresponding to the transmission job by the figure. In that moment, because the broadcast job display controlling part 93 decides that the gesture area detected by the gesture detecting part 94 is the area of the destination icon 113 of the job identifying image, the processing advances to the step ST106.

In the step ST106 (YES, step ST105), the broadcast job display controlling part 93 controls, when the gesture area detected by the gesture detecting part is the area of the destination icon 113 of the job identifying image, to blinkingly display the connecting line 114 of the job identifying image (the job identifying image as the cancel subject).

In a step ST107, the broadcast job display controlling part 93 controls the display 112 to display the process identifier indicating an executable process for the transmission job as the cancel subject. In the embodiment, as the process identifier, the cancel execution icon 118 (refer to FIG. 4) is displayed in the operation area 120 of the job identifying image as the cancel subject.

Ina step ST108, the broadcast job execution controlling part 95 decide whether or not the gesture area detected by the gesture detecting part 94 is the gesture area (hereinafter, often called as "gesture area across the operation area 120") detected in the gesture of sliding across the operation area 120 of the job identifying image as the cancel subject. At that moment, when the broadcast job execution controlling part 95 decide that the gesture area detected by the gesture detecting part 94 is the gesture area across the operation area 120 (YES, step ST108), the processing advances to a step ST109.

On the other hand, when the broadcast job execution controlling part 95 decide that the gesture area detected by the gesture detecting part 94 is not the gesture area across the operation area 120 (NO, step ST108), the processing returns to the step ST108.

In addition, the broadcast job execution controlling part 95 may start a timer after the cancel execution icon 118 is displayed. In this case, if the gesture area across the operation area 120 of the job identifying image as the cancel subject is not detected within five seconds, the broadcast job execution controlling part 95 may stop blinkingly displaying the job identifying image as the cancel subject or displaying the cancel execution icon 118 and make the processing returned to the step ST104.

In the step ST109 (Yes, step ST108), the broadcast job execution controlling part 95 controls the broadcast job executing part 92 to cancel the transmission jobs not yet transmitted among the transmission jobs as the cancel subject.

In a step ST110, the broadcast job display controlling part 93 controls, when the broadcast job executing part 92 is executing the process of canceling the transmission job as the cancel subject, the display 112 to display the process executing identifier indicating that the process indicated by the cancel execution icon 118 is executing. In the embodiment, as the process executing identifier, the cancel execution icon 118 is blinkingly displayed on the display 112.

In a step ST111, the broadcast job display controlling part 93 controls, when the broadcast job executing part 92 completes the process of canceling the transmission job as the cancel subject, the display 112 to display the process completion identifier indicating that the process indicated by the cancel execution icon 118 is completed. In the embodiment, as the process completion identifier, the cancel completion icon 119 (refer to FIG. 4) is displayed on the display 112.

After the processing of the step ST111 is finished, the processing returns to the step ST104. At that moment, the broadcast job executing part 92 decides that the data transmission is completed to all the transmission jobs, the processing of the flow chart is finished.

Next, the operation in another case where the user cancels a predetermined transmission job during the execution of the broadcast and variation of the display image 111 according to the operation in the multifunction machine 1 of the embodiment will be described. FIGS. 6 to 10 illustrate the display image displayed by the display during the execution of the broadcast.

Figure 6:
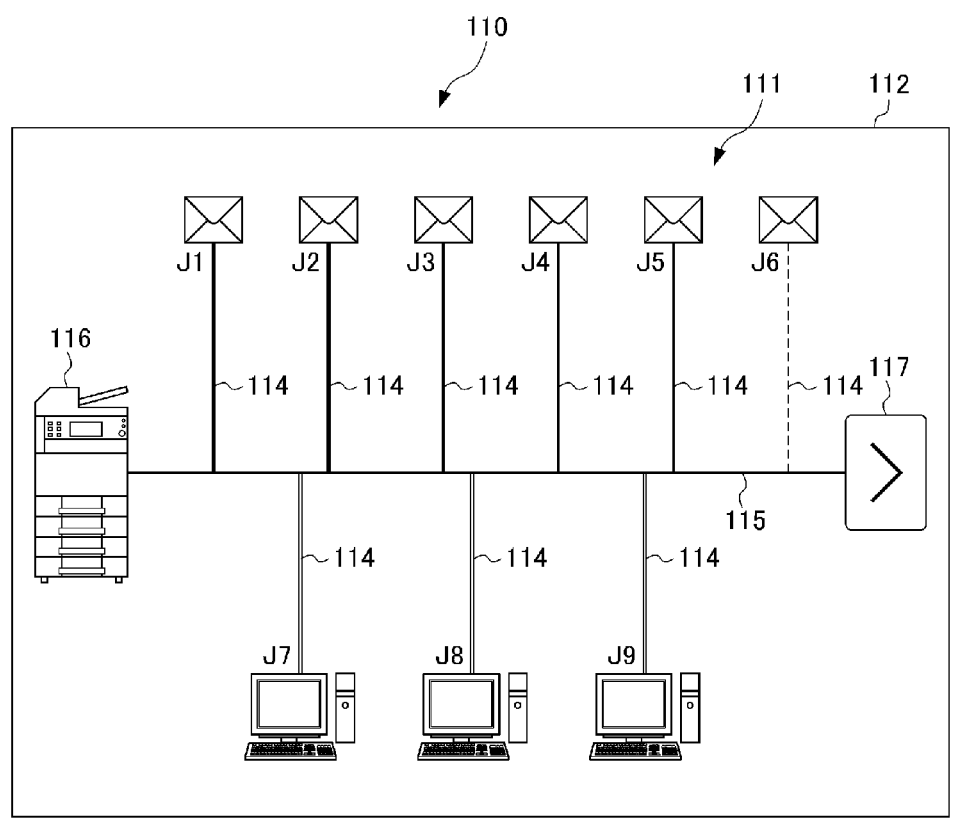
FIG. 6 is an illustrative diagram schematically showing an image displayed by the display during execution of the broadcast in the multifunction machine according to the embodiment of the present disclosure.

First, the user directs the execution of the broadcast by handling the start key of the operating section 70 (refer to FIG. 3), and accordingly, the display image 111 having the job identifying image J1 to J9 is displayed on the display 112 as shown in FIG. 6. In the display image 111 shown in FIG. 6, the job identifying images J1 to J3 have the connecting lines 114 designed by single bold line (corresponding to the red line on the actual display). Therefore, the user can understand that, among the job identifying images J1 to J9, the transmission jobs corresponding to the job identifying images J1 to J3 are executing (transmitting the data).

In addition, in the display image 111 shown in FIG. 6, the job identifying images J4 and J5 have the connecting lines 114 designed by single thin line (corresponding to the blue line on the actual display). Therefore, the user can understand that, among the job identifying images J1 to J9, the transmission jobs corresponding to the job identifying images J4 and J5 are completed.

Moreover, in the display image 111 shown in FIG. 6, the job identifying image J6 has the connecting line 114 designed by the broken line (corresponding to the green line on the actual display). Therefore, the user can understand that the error is caused in the transmission job corresponding to the job identifying image J6.

Furthermore, in the display image 111 shown in FIG. 6, the job identifying images J7 to J9 have the connecting lines 114 designed by double thin lines (corresponding to the grey line on the actual display). Therefore, the user can understand that, among the job identifying images J1 to J9, the transmission jobs corresponding to the job identifying images J7 to J9 are waiting.

As mentioned above, in the multifunction machine 1 of the embodiment, because the display image 111 as shown in FIG. 6 is displayed on the display 112 when the execution of the broadcast is directed, the user can grasp a progress of the entire broadcast in a lump.

Figure 7:
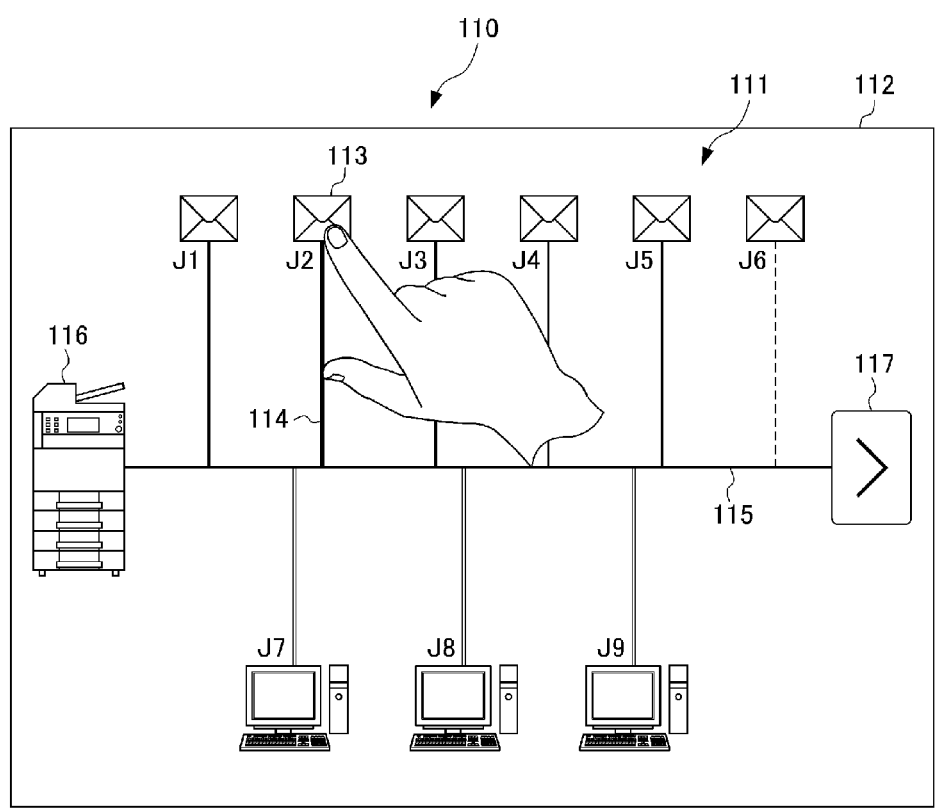
FIG. 7 is an illustrative diagram schematically showing another image displayed by the display during execution of the broadcast in the multifunction machine according to the embodiment of the present disclosure.
Figure 8:
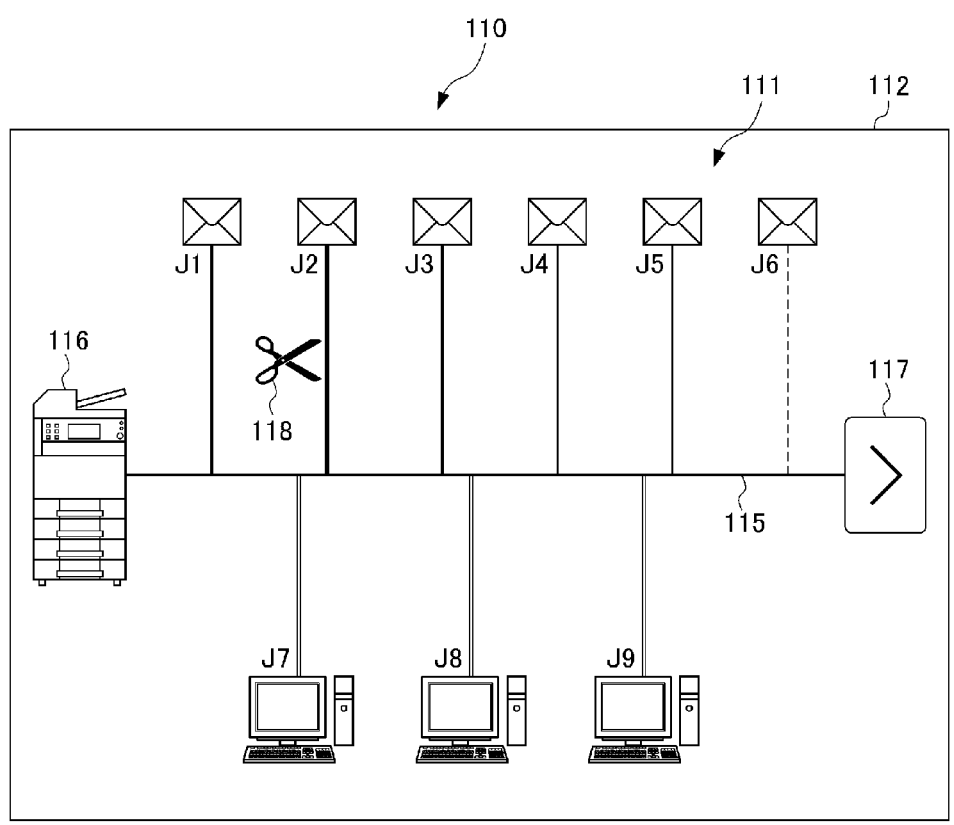
FIG. 8 is an illustrative diagram schematically showing a further image displayed by the display during execution of the broadcast in the multifunction machine according to the embodiment of the present disclosure.

Next, in a state of the display image 111 shown in FIG. 6, it is assumed that the user notices that the destination is incorrect and the user desire to cancel the transmission job corresponding to the job identifying image J2 of the incorrect destination. In this case, the user may handle, as shown in FIG. 7, the gesture pointing to the destination icon 113 of the job identifying image J2. Accordingly, in the display image 111, the connecting line 114 of the job identifying image J2 as the cancel subject is blinkingly displayed (not shown). Subsequently, as shown in FIG. 8, in the operation area 120 (not shown) of the job identifying image J2 as the cancel subject, the cancel execution icon 118 (the process identifier) is displayed. Therefore, the user can perceive the executable process for the transmission job as the cancel subject.

Figure 9:
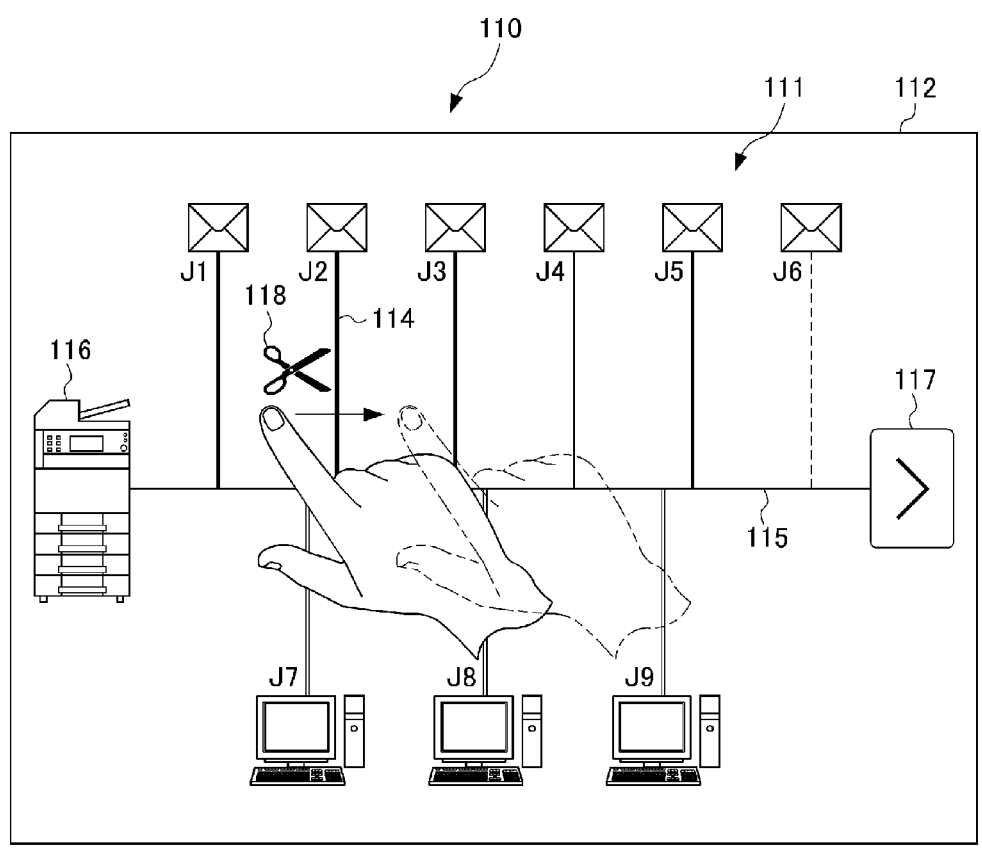
FIG. 9 is an illustrative diagram schematically showing still another image displayed by the display during execution of the broadcast in the multifunction machine according to the embodiment of the present disclosure.

Moreover, in another state of displaying the cancel execution icon 118 on the display 112, the user may handle, as shown in FIG. 9, the gesture across the operation area 120 (e.g. the connecting line 114) of the job identifying image J2. Accordingly, in the display image 111, the cancel execution icon 118 is blinkingly displayed (not shown). In the embodiment, the blinking of the cancel execution icon 118 indicated that the process executing identifier is displayed. The user can understand by seeing the blinking of the cancel execution icon 118 that the cancel of the transmission job corresponding to the job identifying image J2 is executing. In addition, when the user handles the gesture across the operation area 120 of the job identifying image J2, the cancel execution icon 118 may be displayed so as to be shifted along the gesture's direction.

Figure 10:
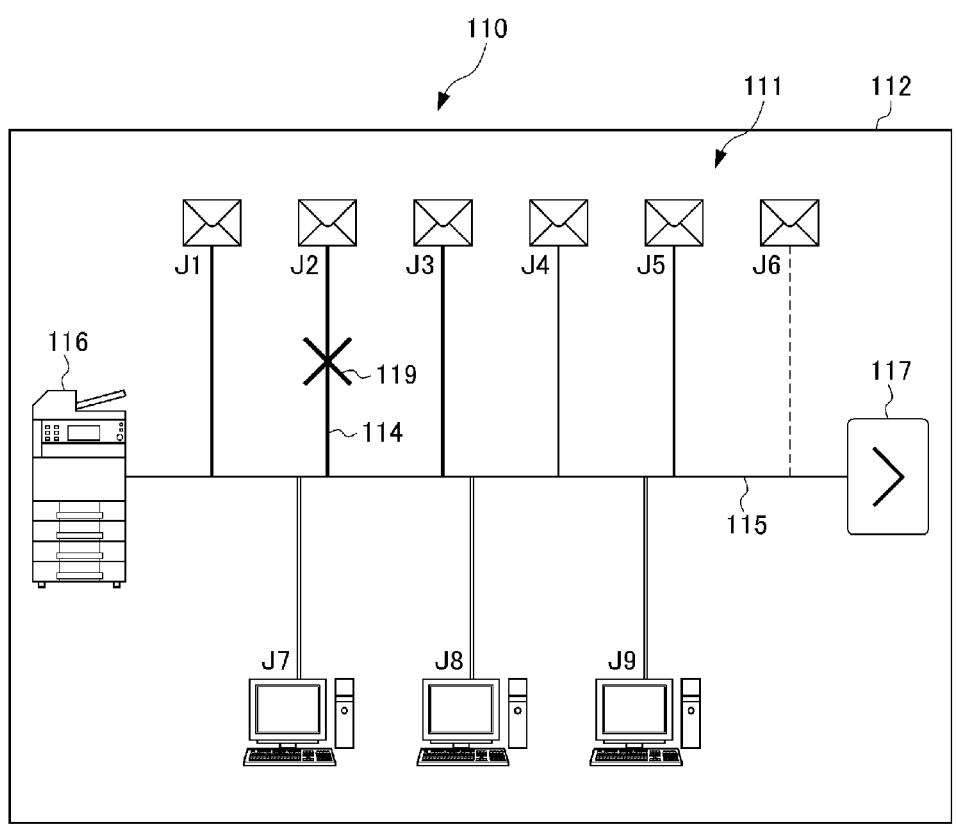
FIG. 10 is an illustrative diagram schematically showing still further image displayed by the display during execution of the broadcast in the multifunction machine according to the embodiment of the present disclosure.

After that, when the cancel of the transmission job corresponding to the job identifying image J2 is completed, as shown in FIG. 10, the cancel completion icon 119 (the process completion identifier) indicating that the execution of the cancel is completed is superimposed on the connecting line 114 of the job identifying image J2 as the cancel subject.

As mentioned above, by handling the gesture pointing to the destination icon 113 of the job identifying image J2 to be cancelled and the gesture across the connecting line 114 of the job identifying image J2, the user can cancel the transmission job corresponding to the job identifying image J2. That is, in the embodiment, the user can cancel the transmission job corresponding to the executing job identifying image J2 by the gestures (operation) of two steps.

As described above, in accordance with the multifunction machine 1 of the embodiment, for instance, the following advantages can be provided.

The multifunction machine 1 of the embodiment makes, when the gesture area detected by the gesture detecting part 94 is the area of the destination icon 113 of one job identifying image among the plurality of the job identifying images, the display 112 displayed the cancel execution icon 118 indicating the executable process for the transmission job as the cancel subject. The multifunction machine 1 also cancels, in the state of displaying the cancel execution icon 118, when the gesture area detected by the gesture detecting part 94 is the gesture area across the operation area 120 of the job identifying image, the transmission job not yet transmitted among the transmission jobs corresponding to the job identifying image.

Thus, in accordance with the multifunction machine 1 of the embodiment, the user can cancel, by two simple gestures to the job identifying image corresponding to the transmission job that is not desired to execute, the transmission job during the execution of the broadcast. Therefore, in accordance with the multifunction machine 1 of the embodiment, the user can immediately cancel the transmission job without complicated operation for the cancel.

Particularly, because the multifunction machine 1 displays the cancel execution icon 118 (the process identifier) on the display 112, the user can easily understand the executable process for the transmission job as the cancel subject.

Moreover, in particular, in the state of displaying the cancel execution icon 118, when the user does not handle the gesture (the gesture corresponding to the predetermined pattern) across the operation area 120 of the job identifying image, the multifunction machine 1 does not cancel the transmission job as the cancel subject. Therefore, it is possible to prevent the transmission job from canceling by a careless gesture of the user.

In addition, the multifunction machine 1 varies the appearance of the job identifying image (the job identifier) displayed on the display 112 according to the communication state of the transmission job corresponding to the job identifying image. Therefore, the use can immediately understand at a glance whether each transmission job is transmitting or waiting during the execution of the broadcast.

Furthermore, when the gesture area detected by the gesture detecting part 94 is the area of the destination icon 113 of one job identifying image among the plurality of the job identifying images, the multifunction machine 1 blinkingly displays the connecting line 114 of the job identifying image so as to be differed or distinguished from the connecting line 114 of the other job identifying images. Therefore, the user can securely discriminate his/her directing job identifying image as the cancel subject from the other job identifying images.

Moreover, during the execution of the process indicated by the cancel execution icon 118, the multifunction machine 1 displays, on the display 112, the process executing identifier indicating that the process indicated by the cancel execution icon 118 is executing. Therefore, the user can easily confirm that the cancel of the transmission job as the cancel subject is executing.

Particularly, because the multifunction machine 1 displays the blinking of the cancel execution icon 118 as the process executing identifier, the user can immediately understand at a glance that the process indicated by the cancel execution icon 118 is executing. In addition, because the blinking of the cancel execution icon 118 is displayed as the process executing identifier, it is possible to keep the displayed icons in the small quantities, thereby providing operation environment easily understood by the user.

Furthermore, when the process indicated by the cancel execution icon 118 is completed, the multifunction machine 1 displays, on the display 112, the cancel completion icon 119 (the process completion identifier) indicating that the execution of the process indicated by the cancel execution icon 118 is completed. Therefore, the user can easily confirm that the cancel of the transmission job as the cancel subject is completed.

The disclosure is not restricted by the above-mentioned embodiment, but can be actualized by various embodiments.

For instance, during the execution of the broadcast, when the gesture area detected by the gesture detecting part 94 is the area of the destination icon 113 of one job identifying image, if the transmission job corresponding to the job identifying image is not yet transmitted, the broadcast job execution controlling part 95 controls the broadcast job executing part 92 to cancel the transmission job.

In such a case, the user can cancel, by one gesture pointing to the destination icon 113 of the job identifying image corresponding to the transmission job that is not desired to execute, the transmission job. Therefore, the user can more immediately cancel the transmission job. Alternatively, instead of the gesture pointing to the destination icon 113, another gesture sliding across at least apart of the operation area 120 (e.g. the connecting line 114) may be used for the cancel.

In addition, during the execution of the broadcast, when the gesture area detected by the gesture detecting part 94 is the area of the destination icon 113 of one job identifying image, if the transmission job corresponding to the job identifying image is executing, the broadcast job execution controlling part 95 controls the broadcast job executing part 92 to not execute the transmission job and to carry down of the turn to execute the transmission job in the storage 80 later than other transmission jobs waiting the execution.

In accordance with this, the user can acquire time, with regard to the transmission job directed the cancel to the multifunction machine 1, to consider whether or not the direction of the cancel is correct. That is, as a result of the examination whether or not the cancel direction is correct, when the user decides that the cancel direction is correct, the user can anew operate the cancel direction during the waiting the execution of the transmission job carried out the turn to execute.

Then, the transmission job carried out the turn to execute is automatically executed when the turn of the execution comes. Therefore, as a result of the examination whether or not the cancel direction is correct, when the user decides that the direction canceling the transmission job is incorrect, the user can advance the execution of the transmission job without any operation. That is, when the user decides that the transmission job should not be cancelled, it is possible to avoid the trouble of anew directing the data destination and transmission data for executing the transmission job.

Alternatively, instead of carrying down the turn to execute the transmission job, the broadcast job execution controlling part 95 may control to hold the execution of the transmission job. In addition, a further icon indicating the carrying down of the turn to execute the transmission job or the hold of the execution of the transmission job may be displayed at a predetermined position on the display 112. By displaying such a further icon, the user can immediately understand at a glance that there is a transmission job to be considered whether or not the cancel direction is correct.

The embodiment was described as an example that, in order to direct the transmission job as the cancel subject, one job identifying image is pointed to. However, the disclosure is not restricted by this instance and, in order to direct the transmission job as the cancel subject, two or more job identifying images may be pointed to.

For instance, with regard to a plurality of the job identifying images as the cancel subject, the user may handle a gesture pointing to the respective destination icons 113 in order by the finger, or alternatively, another gesture successively sliding across the respective destination icons 113 or respective connecting lines 114. In addition, when the user handles such a gesture, the cancel execution icon 118 may be displayed to move along the gesture direction.

Moreover, the embodiment may be configured to more simply direct the plurality of the job identifying images as the cancel subject. For instance, with reference to FIG. 4, in order to direct the job identifying images J1 to J3 as the job identifying image as the cancel subject, a first gesture is handled to point to a vacant space at a left side of the destination icon 113 of the job identifying image J1 by the finger, and then, a second gesture is handled to point to another vacant space at a right side of the job identifying image J3 by the finger. Thereby, the user can direct, as the job identifying images as the cancel subject, the job identifying images J1 to J3 located between two positions pointed by the first and second gestures.

In addition, when the user handles the gestures pointing to the vacant spaces on the display 112, if the points are three or more, the embodiment may be configured to validly determine the gestures to most outside two points, and then, to decide that the job identifying images located between the two points are directed. Then, with regard to an operating pattern in a case of simultaneously directing a plurality of the icons, the embodiment may be configured to choice a desired operating pattern among a predetermined plurality of the operating patterns by the user or to determine the desired operating pattern by the user.

Thus, because the multifunction machine 1 of the embodiment can collectively direct the plurality of the job identifying images as the cancel subject, it is possible to simplify the operation canceling the plurality of the transmission jobs, and moreover, to shorten time needed to the operation. Therefore, if there are the plurality of the transmission jobs needed to cancel, it is possible to decrease inconveniently problems that, during the operation canceling one transmission job, other transmission jobs desired to cancel are completed.

The embodiment was also described as an example that, when the gesture area detected by the gesture detecting part 94 was the area partly corresponding to the operation area 120 (a range indicated by the broken line in FIG. 4) having the display area of the job identifying image, the broadcast job display controlling part 93 and broadcast job execution controlling part 95 executed various processes to the job identifying image or the transmission job corresponding to the job identifying image. However, the disclosure is not restricted by this example. When the gesture area detected by the gesture detecting part 94 is an area entirely corresponding to the operation area 120 (a range indicated by the broken line in FIG. 4) having the display area of the job identifying image, the broadcast job display controlling part 93 and broadcast job execution controlling part 95 may execute various processes to the job identifying image or the transmission job corresponding to the job identifying image. That is, the user's gesture corresponding to the job identifying image may be a gesture to a part of the operation area 120 having the display area of the job identifying image or another gesture to the entire operation area 120.

Moreover, the embodiment was described as an example that the color (the line type in the embodiment) of the connecting line 114 of the job identifying image was varied according to the communication state of the transmission job corresponding to the job identifying image. However, the disclosure is not restricted by this example and may vary colors, patterns, form or the like appearance of the destination icon 113 of the job identifying image.

In addition, the embodiment was described as an example that the connecting line 114 of the job identifying image as the cancel subject was blinkingly displayed. However, the disclosure is not restricted by this example and may blinkingly display the destination icon 113 of the job identifying image as the cancel subject or alternate the blinks of the destination icon 113 and connecting line 114. Alternatively, in the job identifying image as the cancel subject, the destination icon 113 and/or connecting line 114 may be displayed in different color from the general state. Furthermore, near the job identifying image as the cancel subject, another icon may be displayed to indicate that the transmission job corresponding to the job identifying image is as the cancel subject.

Moreover, the embodiment was described as an example that the cancel execution icon 118 was displayed as the process identifier indicating the executable process for the transmission job as the cancel subject. However, the disclosure is not restricted by this example. A item displayed as the process identifier indicating the executable process for the transmission job as the cancel subject may be an icon for withdrawing (restoring) the determination that the transmission job is the subject to cancel, another icon for withdrawing the determination that the transmission job is the subject to cancel and carrying down the turn to execute the transmission job later than other transmission jobs waiting the execution or the like item. When a plurality of the process identifier are displayed, the user can select the process to the transmission job according to working condition, thereby more improving convenience.

In addition, the embodiment was described as an example that, as the gesture area corresponding to a predetermined pattern, the gesture area detected when the user horizontally slid the finger was used. However, the disclosure is not restricted by this example and a gesture area detected when the user slides a plurality of the fingers at a time or another gesture area detected when the user slides the finger along a similar profile to a specified a character, a mark, a figure or the like may be used. That is, the gesture area corresponding to a predetermined pattern may apply any area of a detectable and distinguishable gesture from other gestures when the user slides the finger.

Furthermore, the embodiment was described as an example that, as the process executing identifier indicating that the process indicated by the cancel execution icon 118 was executing, the cancel execution icon 118 was blinkingly displayed. However, the disclosure is not restricted by this example. As the process executing identifier, a different icon (e.g. an icon having a sand glass figure) from the cancel execution icon 118 may be displayed near the cancel execution icon 118, or alternatively, this different icon may be displayed instead of the cancel execution icon 118.

Moreover, the embodiment was described as an example that, as the process completion identifier indicating that the process indicated by the cancel execution icon 118 was completed, the cancel completion icon 119 having an X-shaped picture was displayed. However, the disclosure is not restricted by this example and, as the process completion identifier, for example, characters "OFF", "CANCEL COMPLETION" or the like may be displayed. Alternatively, the job identifying image corresponding to the transmission job completed the cancel of the transmission job may be displayed in different color from the other job identifying images or the job identifying image corresponding to the transmission job completed the cancel of the transmission job may be deleted.

The embodiment was described in a case where ideas of the disclosure are applied to the multifunction machine 1. However, the disclosure is not restricted by this and may be applied to a personal computer, facsimile apparatus or the like having a broadcast function. That is, the transmitting apparatus in accordance with the disclosure may be applied to any apparatus in general having a broadcast function.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. A transmitting apparatus, that has a broadcast function transmitting data to a plurality of destination devices via a communication network, comprising:
 a touch panel configured to include a displaying part with a display and a sensing part located at the display side of the displaying part to detect a position and/or an area of a contact object and to output operating position information as detected information, to display a predetermined display image and to receive an operation input having a gesture;
 a broadcast direction receiving part configured to receive the operation input directing execution of the broadcast;
 a broadcast job executing part configured to execute, when the broadcast direction receiving part receives the operation input directing the execution of the broadcast, a plurality of transmission jobs in a predetermined order;
 a broadcast job display controlling part configured to control, when the broadcast direction receiving part receives the operation input directing the execution of the broadcast, the display so as to display identifying information of the transmission job and a job identifier indicating a communication state of the transmission job for every transmission jobs;
 a gesture detecting part configured to detect, on the basis of the operating position information outputted from the touch panel, a gesture area handled on the touch panel by the contact object;
 a broadcast job execution controlling part configured to control, when the gesture area detected by the gesture detecting part is an entirely or partly corresponding area to a given area having a display area of one or more given job identifiers among a plurality of the job identifiers, the broadcast job executing part to not execute the transmission job not yet transmitted among the transmission jobs corresponding to the one or more given job identifiers.

2. The transmitting apparatus according to claim 1, wherein the broadcast job display controlling part varies appearance of the job identifier displayed on the display according to the communication state of the transmission job corresponding to the job identifier.

3. The transmitting apparatus according to claim 1, wherein the broadcast job display controlling part controls, when the gesture area detected by the gesture detecting part is the entirely or partly corresponding area to the given area having the display area of the one or more given job identifiers among the plurality of the job identifiers, to display the appearance of the job identifier displayed on the display so as to be differed from appearance of other job identifiers.

4. The transmitting apparatus according to claim 1, wherein the broadcast job display controlling part controls, when the gesture area detected by the gesture detecting part is the entirely or partly corresponding area to the given area having the display area of the one or more given job identifiers among the plurality of the job identifiers, to display a process identifier indicating an executable process for the transmission job corresponding to the job identifier on the given area having the display area of the job identifier, and
 the broadcast job execution controlling part controls, in a state of displaying the process identifier on the given area, when the gesture area detected by the gesture detecting part is an entirely or partly corresponding area to a given area having the job identifier corresponding to the process identifier, the broadcast job executing part to execute the process indicated by the process identifier to the transmission job corresponding to the job identifier.

5. The transmitting apparatus according to claim 1, wherein the broadcast job execution controlling part controls, when the gesture area detected by the gesture detecting part is a gesture area corresponding to a pattern determined in advance and the entirely or partly corresponding area to the given area having the display area of the one or more given job identifiers among the plurality of the job identifiers, the broadcast job executing part to not execute the transmission job not yet transmitted among the transmission jobs corresponding to the one or more given job identifiers.

6. The transmitting apparatus according to claim 4, wherein the broadcast job display controlling part controls, during the broadcast job executing part executes the process indicated by the process identifier to the transmission job corresponding to the job identifier, to display, on the display, a process executing identifier indicating that the process indicated by the process identifier is executing.

7. The transmitting apparatus according to claim 4, wherein the broadcast job display controlling part controls, during the broadcast job executing part completes the execution of the process indicated by the process identifier to the transmission job corresponding to the job identifier, to display, on the display, a process completion identifier indicating that the process indicated by the process identifier is completed.

8. The transmitting apparatus according to claim 1, wherein the broadcast job execution controlling part controls, when the gesture area detected by the gesture detecting part is the entirely or partly corresponding area to the given area having the display area of the one or more given job identifiers among the plurality of the job identifiers, if the transmission jobs corresponding to the one or more given job identifiers are executing, the broadcast job executing part to not execute the transmission job and to carry down a turn to execute the transmission job later than other transmission jobs waiting the execution.

9. The transmitting apparatus according to claim 1, wherein the broadcast job display controlling part controls to display a destination icon indicating the destination device and a connecting line connected with the destination icon as the job identifier on the display and to indicate, by appearance of the connecting line, the communication state of the transmission job corresponding to the destination device indicated by the destination icon.

10. The transmitting apparatus according to claim 9, wherein the broadcast job execution controlling part controls, when the gesture area detected by the gesture detecting part is the entirely or partly corresponding area to the given area having the display area of one or more destination icons, the broadcast job executing part to not execute the transmission job not yet transmitted among the transmission jobs corresponding to one or more destination devices indicated by the one or more destination icons.

11. The transmitting apparatus according to claim 10, wherein the broadcast job execution controlling part controls, when the gesture detecting part detects a gesture sliding the contact object across the entirely or partly corresponding area to the given area having the display area of the one or more destination icons, the broadcast job executing part to not execute the transmission job not yet transmitted among the transmission jobs corresponding to one or more destination devices indicated by the one or more destination icons.

12. The transmitting apparatus according to claim 4, wherein the broadcast job display controlling part controls to display a cancel execution icon as the process identifier.

13. The transmitting apparatus according to claim 6, wherein the broadcast job display controlling part controls to lightingly display a cancel execution icon as the process identifier and to blinkingly display the cancel execution icon as the process executing identifier.

* * * * *